(12) United States Patent
Qian et al.

(10) Patent No.: US 7,317,917 B2
(45) Date of Patent: Jan. 8, 2008

(54) MOBILE STATION CONNECTION MANAGEMENT UTILIZING SUITABLE PARAMETER INFORMATION

(75) Inventors: Feng Qian, Mission Viejo, CA (US); Stanislaw Czaja, Cardiff, CA (US)

(73) Assignee: VIA Telecom, Inc., San Diego, CA (US)

( * ) Notice: Subject to any disclaimer, the term of this patent is extended or adjusted under 35 U.S.C. 154(b) by 89 days.

(21) Appl. No.: 10/965,060

(22) Filed: Oct. 13, 2004

(65) Prior Publication Data
US 2005/0136937 A1 Jun. 23, 2005

Related U.S. Application Data

(60) Provisional application No. 60/511,261, filed on Oct. 14, 2003.

(51) Int. Cl.
*H04Q 7/20* (2006.01)
(52) U.S. Cl. ............... 455/432.1; 455/453; 455/452.2; 370/345; 370/328
(58) Field of Classification Search ............... 455/439, 455/437, 452.2, 436, 432.1, 453, 455; 370/328, 370/352, 345
See application file for complete search history.

(56) References Cited

U.S. PATENT DOCUMENTS

| | | | |
|---|---|---|---|
| 6,434,389 B1 * | 8/2002 | Meskanen et al. | 455/437 |
| 6,628,946 B1 | 9/2003 | Wiberg et al. | |
| 6,992,993 B1 * | 1/2006 | Park et al. | 370/328 |
| 2001/0011019 A1 * | 8/2001 | Jokimies | 455/449 |
| 2002/0193112 A1 * | 12/2002 | Aoki et al. | 455/437 |
| 2002/0197992 A1 * | 12/2002 | Nizri et al. | 455/435 |
| 2003/0211849 A1 * | 11/2003 | Robinson | 455/442 |
| 2004/0013103 A1 * | 1/2004 | Zhang et al. | 370/345 |
| 2004/0058679 A1 * | 3/2004 | Dillinger et al. | 455/439 |
| 2004/0092259 A1 * | 5/2004 | Blanc et al. | 455/432.1 |
| 2006/0014544 A1 * | 1/2006 | Tolli | 455/453 |

OTHER PUBLICATIONS

"Physical Layer Standard for cdma2000 Spread Spectrum Systems, Revision D", 3GPP2 C.S0002-D, Version 1.0, p. 2-175, Feb. 13, 2004.
"Medium Access Control (MAC) Standard for cdma2000 Spread Spectrum Systems, Release C", 3GPP2 C.S0003-C, Version 1.0, pp. 1-5 to 1-7, 1-9 to 1-10, 1-13, 1-15, 2-9, 2-14, 2-16, 2-17, 2-97, 2-103, 2-105, 2-106, 2-107, 2-109, 2-110, 2-122, 2-123, 2-128, 2-129, 2-136, 2-138 to 2-142, May 28, 2002.
"Upper Layer (Layer 3) Signaling Standard for cdma2000 Spread Spectrum Systems, Release C", 3GPP2 C.S0005-C, Version 1.0, pp. 1-4, 1-13, 1-19, 1-38, 2-86, 2-87, 2-167, 2-171, 2-341, 2-395, 2-398, 2-399, 2-402, 2-496 to 2-513, 2-531 to 2-533, 2-688, 3-68, 3-90, 3-110, May 28, 2002.

* cited by examiner

*Primary Examiner*—Danh Le
(74) *Attorney, Agent, or Firm*—Jaquez & Associates; Martin J. Jaquez, Esq.; Lisa M. Griffith, Esq.

(57) ABSTRACT

A method and apparatus managing a list of base stations ("BSs") for which a mobile station ("MS") can establish an optimal communications channel are disclosed. In accordance with the teachings disclosed herein, a MS acquires suitable parameter information ("information") and bases a subsequent switching decision based upon such information. Suitable parameters comprise cell loading and/or service priority, and MS needs. Such information comprises, for example, a number of BS users, switching latency associated with a particular BS, applications available by a BS, available code space, and a number of MSs for which a particular BS can provide resources. A MS decision to switch from a first BS to a second BS is predicated upon the acquired information.

28 Claims, 6 Drawing Sheets

| Base Station Identifier | BS A | BS B | BS C | BS D | BS E | BS F | BS G |
|---|---|---|---|---|---|---|---|
| Cell Loading Indicator Value | 0 | 1 | 0 | 1 | 1 | 1 | 0/1 |

104 — Base Station Identifier row
105 — Cell Loading Indicator Value row

*FIG. 1B*

| Field | Number of bits |
|---|---|
| MACID | 8 |
| EP_SIZE | 3 |
| EXT_MSG_TYPE | 2 |
| EXT_MSG_SUB_TYPE (previously reserved bits) | 2 |
| CELL_LOADING_INDICATOR (previously reserved bits) | 6 |

- 129 MACID
- 130 EP_SIZE
- 131 EXT_MSG_TYPE
- 132 EXT_MSG_SUB_TYPE
- 133 CELL_LOADING_INDICATOR

FIG. 1E

MOBILE STATION CONNECTION MANAGEMENT UTILIZING SUITABLE PARAMETER INFORMATION

CROSS REFERENCE TO RELATED APPLICATION-CLAIM OF PRIORITY

This application claims priority under 35 USC 119 to U.S. Provisional Application No. 60/511,261 filed Oct. 14, 2003 and entitled "Cell Loading Indication Via F-PDCCH," the contents of which are hereby incorporated in their entirety by reference.

BACKGROUND

This invention generally relates to wireless communications, and more specifically to communications systems that transfer information between base stations and mobile stations.

RELATED ART

Wireless communication systems facilitate high-speed connectivity and data and voice transport from point-to-point and point-to-multipoint bases. The first-generation (analog) and the second-generation (digital) wireless networks were used primarily for communicating voice traffic from cellular phones, and thus maintained a focus on access methods for the efficient transport of voice information. With the rising popularity of the Internet, a third-generation (3G) wideband multimedia cellular network has been proposed that transports both voice and data at much higher speeds than were previously available using the first and second generation wireless networks.

The state of the art for wireless cellular communications systems is substantially reflected in documents published by standardization bodies. The Third Generation Partnership Project 2 (3GPP2) is primarily responsible for defining specifications to transition current code-division multiple-access (CDMA) wireless networks to the third generation, commonly referred to as CDMA2000. One such specification is commonly referred to as the "CDMA2000 1x Revision D", or "cdma2000 Release D" (this specification is also referred to as "IS-2000-D", and "IS-2000-Rel. D"). The CDMA2000 1x Revision D specification, available from the 3GPP2, is incorporated by reference herein in its entirety for its teachings on communications protocols used in 3G wireless communications systems.

This non-provisional application also hereby incorporates by reference herein the following documents (covering wireless communication standards) in their entirety:

C.S0003-C, version 1.0, entitled "Medium Access Control (MAC) Standard for cdma2000 Spread Spectrum Systems, Release C, published May 28$^{th}$, 2002(available from the 3 GPP2), hereafter referred to as the "C.S0003 MAC Standard"; C.S0002-C, entitled "Physical Layer Standard for cdma2000 Spread Spectrum Systems", published September 2001 (available from the 3GPP2), hereafter referred to as the "C.S0002 Physical Layer Standard"; C.S0004-C, entitled "C Link Access Control (LAC) Standard for cdma2000 Spread Spectrum Systems", published September, 2001 (available from the 3GPP2), hereafter referred to as the "C.S0004 Link Access Control (LAC) Standard"; C.S0005-C, entitled "Upper Layer (Layer 3) Signaling Standard for cdma2000 Spread Spectrum Systems", published September, 2001 (also available from the 3GPPS), hereafter referred to as the "C.S0005 Upper Layer Signaling Standard"; and C.S0002-D, entitled "Physical Layer Standard for cdma2000 Spread Spectrum Systems, release D".

As is well known, cellular communications systems generally employ portable transceivers, each of which is called a mobile station ("MS"), for user communications. Such systems are one-to-many in nature, and generally include a relatively modest number of base stations ("BSs") that each communicate with many MSs. The BSs are disposed as needed throughout geographical areas, to satisfy user demands for range and connection volume. Due to their portable nature, it is advantageous for the cellular system to keep a dynamic inventory of BSs to which the MS may potentially connect at any given time. In CDMA cellular systems, these dynamic inventories may be denoted as either an active set, candidate set, or neighbor set, ("sets"). The active set is a set of six BSs to which a MS can switch to maintain continuity of communications.

As described in C.S0002-D ("Physical Layer Standard for cdma2000 Spread Spectrum Systems"), the MS uses a reverse channel quality indicator channel to transmit channel quality indicator (CQI) measurements, including carrier to interference (C/I) measurements, associated with each BS in the active set. The decision whether to maintain primary communications (e.g., forward packet data channel) with a particular BS, or switch to another BS, is solely based upon the CQI measurements. That is, in current cellular systems, a MS decides which BS to switch to based on a power measurement (C/I); whichever BS has the best signal power is the BS the MS selects.

In one example illustrating a disadvantage of the prior art, a MS might decide to switch from a first BS to a second BS, because the first BS's pilot signal strength is weaker than the second BS's pilot signal. However, the second BS, although having a stronger pilot, might be at its bandwidth capacity limit to handle MSs, and as such will be unable to accommodate the new MS switching to it. In this case, the call is dropped, because the BS does not have additional capacity. In this case, it might have been better for the MS to have remained in communications with the first BS, even though it had a weaker signal, but it had sufficient bandwidth capacity to handle the MS. Because switching decisions are based merely upon CQI measurements, the MS may make less than optimal decisions.

The above described disadvantage of the prior art is further exacerbated by the fact that there is a growing public demand for data (as opposed to voice) transmission across cellular networks, which typically require higher bandwidths than voice.

Because in current cellular systems a switching decision is based solely upon CQI measurements, the MS has no information about other factors, such as for example a particular BS's capacity for a limited number of users, whether that particular BS has the applications the MS requires (e.g., data, VOIP), whether a BS has available Walsh space, latency associated with switching to a new BS, or latency associated with receiving voice or data from a particular BS.

Latency refers to a time period. Although some data applications in a MS can handle latency in receiving information from a BS via buffering, voice applications are intolerant to such latency, and buffering does not solve this disadvantage, as such buffering typically makes voice sound choppy and confusing to a listener. Hence, there is a need to provide a MS with more information regarding each BS for which the MS might switch to, in order to allow the MS to more intelligently switch to a BS which can handle the particular needs of the MS, such as for example, latency.

"Switching latency" refers to a period of time during which a MS changes primary communications from a first BS to a second BS. One way to think of switching latency is as a "delay" in starting service from a new BS. In one example, a MS alerts a cellular wireless network that it intends to drop a connection to a first BS, to which the MS has initial primary communications, and request primary communications with a second BS. The period of time to switch from the first BS to the second BS is the "switching latency". Latency is a disadvantage in cellular communications. Because switching latency can cause such a long delay in handoff time between BSs, a call may be dropped.

Switching latency can be caused by several reasons, including the importance (priority) of a particular MS to a BS. Also, a BS may be fully loaded with callers and unable to comply with a switching request from a MS asserting such a switch request, due to no available bandwidth or code space. Whatever the reason for the switching latency, it is a disadvantage not solved by the prior art. Modernly, MSs do not find out that a latency associated with a particular BS is fatal to a call until after the MS has initiated a switch to that BS, because the MS has no information about a particular BS regarding switching latency prior to initiating the switch.

In modern cellular networks, only one BS (serving BS) in an active set provides a MS with a forward packet data channel (F-PDCH). When the MS decides it should switch to another BS transmitting with more power, the MS initiates a pattern, alerting the network that the MS will disable the serving BS (i.e., terminate the F-PDCH), while enabling the transmission from the target cell. In response to this selection the MS may receive a reject message indicating that no service is available. In this case the target BS cannot be re-enabled without L3 signaling. This is a disadvantage of the prior art, because a MS may lose all active set members before an L3 message re-enables some of the active set members, as the latency of L3 signaling is on the order of 300-500 ms. If a MS loses all active set members, the most likely outcome is a dropped F-PDCH service, which means the MS's call will be dropped.

Therefore, a need exists for a method to more intelligently manage of a list of BS candidates that overcomes the disadvantages of previously proposed solutions. The present teachings provide such a method.

SUMMARY

A method is described herein for more efficiently managing connections between base stations ("BSs") and mobile stations ("MSs"). In some embodiments, the method aids the MS in making a switching decision from a first BS to a second BS.

One embodiment is a method of managing connections between a MS and one or more BSs. The MS acquires a list of suitable parameters relevant to establishing a connection to a BS on an authorized connection list. Suitable parameters comprise priority information, cell loading information, and MS needs. At the MS, the BSs are organized into the authorized connection list, from which the MS can selectively request a connection to a particular BS based on the MS's suitable parameters.

In one embodiment of the method, in a CDMA system, suitable parameter information is transmitted from a serving BS to a MS across an extended packet data control channel ("PDCCH") message or in a packet data channel ("PDCH") message.

In one embodiment of the method each BS on a MS's list transmits to the MS an indication of cell loading and/or priority information associated with each respective BS on the authorized connection list. In one embodiment, the MS makes a decision to switch to another BS based upon such priority and/or cell loading information.

BRIEF DESCRIPTION OF THE DRAWINGS

Embodiments of the present invention will be more readily understood by reference to the following figures, in which like reference numbers and designations indicate like elements.

FIG. 1B is a diagram illustrating cell loading information for a plurality of base stations on an authorized connection list.

FIG. 1E is an exemplary message data packet format for suitable parameter information.

DETAILED DESCRIPTION

Overview

The present teachings comprise a method for providing a mobile station ("MS") with information relevant to making an intelligent base station ("BS") switching decision. Embodiments comprise a method by which the MS receives BS priority and/or cell loading information, and based on such information, the MS selects a particular BS to assert a request for a primary communications channel from a BS. One embodiment, in a wireless communications system, addresses the disadvantage in the prior art of latency by providing a MS with BS latency information prior to the MS asserting a switching request to a network.

Hence, in one embodiment, the MS can decide not to switch to a particular BS if the associated latency could cause problems for the MS, such as for example a dropped call or an unacceptable loss of quality of service.

Although many of the exemplary embodiments used herein describe the present teachings in the context of a cdma2000 system, those of ordinary skill in the art will readily appreciate that the present teachings may be implemented and practiced in literally any CDMA system, such as for example any cdma2000 EV-DV or wideband CDMA (W-CDMA) system, without undue experimentation.

Exemplary Implementation in a Cellular Communications System

A MS typically has a plurality of BSs on an authorized connection list, for which primary communications either are currently established, have previously been established, or will potentially in the future be established. In some embodiments of the present teachings, the authorized connection list is updated periodically via an extended packet data control channel message (F-PDCCH). In one embodiment, only a serving BS transmits a F-PDCCH extended message to the MS. Alternate embodiments include a plurality of BSs transmitting F-PDCCH extended messages to the MS.

In accordance with some embodiments of the present teachings, a MS collects information from a F-PDCCH regarding whether a particular BS has suitable parameters for establishing a primary connection with the MS. Suitable parameters comprise cell loading information, priority information, and/or needs of the MS. Based on this suitable parameter information, the MS can make an intelligent decision regarding what BS is the best switching choice. In contrast to current cellular systems (wherein a MS merely makes such a switching decision based upon CQI measurements) some embodiments taught herein allow the MS to make a switching decision based on more information than the prior art.

Figure 1A:
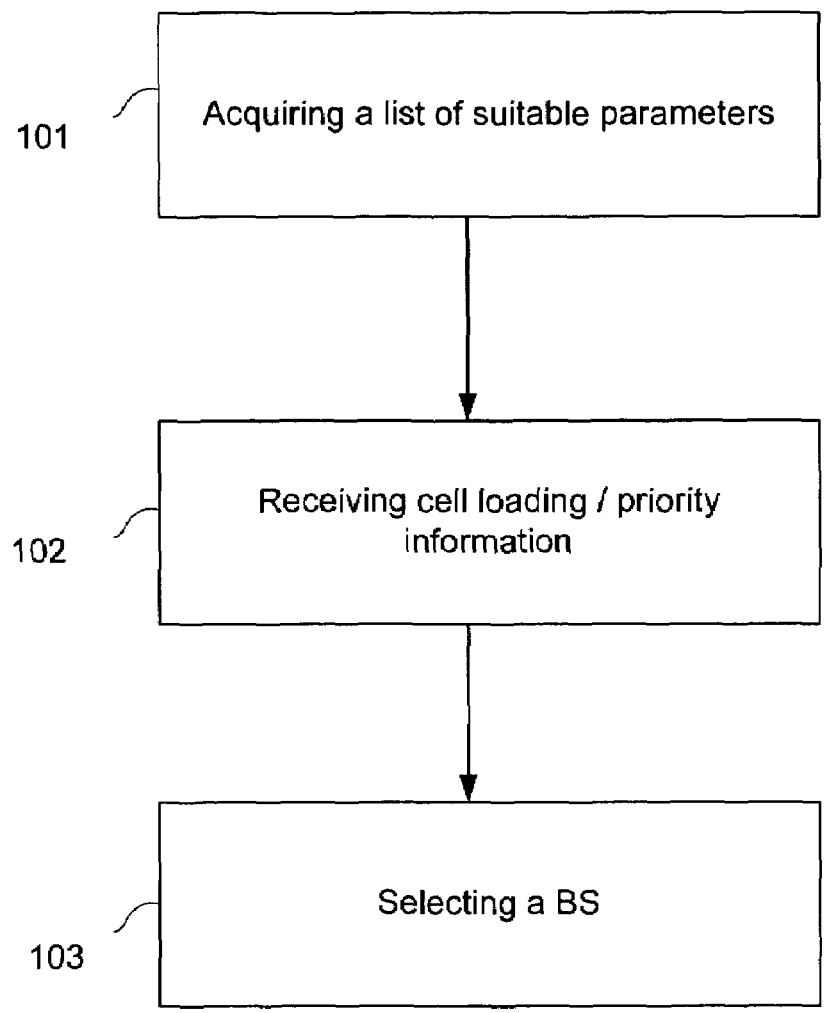
FIG. 1A is a process diagram for an improved method of managing MS connections to BSs, utilizing suitable parameter information.

FIG. 1A illustrates one embodiment of the method 100 of the present teachings. In STEP 101 of the method 100, a MS initiates a process of acquiring a list of suitable parameters. Suitable parameters comprise service priority information, cell loading information, and specific needs of the particular MS, as will be described in detail below.

Service Priority Information

Service priority is a relative measure of the importance of a MS to a particular BS verses the importance of other MSs to the BS. In one embodiment, if a first user of a MS pays more money for service than a second subscriber, then a BS could discriminate in favor of the first user. Other embodiments include service priorities, such as emergency channel assignments for emergency services.

Cell Loading Information

Cell loading information can either be static cell loading information or dynamic cell loading information. Cell loading information can also include information reflective of physical channel quality.

Static Cell Loading Characteristics

Static cell loading characteristics (e.g., applications available, location of BS, static switching latency, static broadcast latency) are inherent characteristics of a particular BS in the network and typically do not change over time.

Examples of applications available from a BS comprise, voice, data, VOIP, and audio and video broadcasting. Static switching latency comprises inherent characteristics of a particular BS, irrespective of current BS activities (e.g., cellular traffic) of that particular BS. In the context of a CDMA system, if a particular BS is attempting to provide a F-PDCH as quickly as possible to a MS requesting to switch from a first BS to the particular BS, without priority conflicts, this time period for switching would be considered a static cell loading characteristic, because this time period is the inherent BS's switching speed. In one embodiment, a MS receives static switching latency information from a BS and determines whether to switch to that BS based on the static switching latency information.

Static broadcast latency also comprises an inherent BS characteristic. This latency is static in the sense that the broadcast time period is based on characteristics inherent to the particular BS, which do not change over time. Broadcast latency is the time period it takes for a BS to process and transmit a MS's request for information (e.g., voice, data, and applications).

Dynamic Cell Loading Characteristics

Dynamic cell loading characteristics (e.g., number of users, power available, code space, state of current users queues, dynamic switching latency, dynamic broadcast latency), change over time.

Dynamic switching latency comprises characteristics of a particular BS dependent upon current activities of that BS. That is, this time period would be considered a dynamic cell loading characteristic, because the BS switching speed is dependent upon some attribute other than the inherent switching speed of the BS. In one embodiment, a possible reasons for a BS to not switch as quickly as possible is because another MS has a higher priority to the BS than the requesting MS. This cell loading characteristic is "dynamic" in the sense that it can change over time and is not an inherent attribute of the BS, but can change depending, for example, upon what MS has priority at any given time.

Dynamic broadcast latency is typically MS priority specific. That is, if a particular BS has the inherent ability to process and transmit to a first MS immediately, but selectively chooses to process and transmit to a second MS due to a priority conflict, such a time interval for the first MS to receive the transmission is a dynamic broadcast latency characteristic. This latency is dynamic, in the sense that it can change over time. Other reasons for dynamic latency are possible, such as the MS moving in and/or out of the BS service area.

Total Switching Latency

The total time for a MS to switch from a first BS to a second BS is called "total latency". Total latency is a sum of the static switching latency, static broadcast latency, dynamic switching latency, and the dynamic broadcast latency between a first and a second BS, and is expressed in units of time.

Mobile Station Needs

Mobile station needs are MS specific, and comprise a particular type of service needed, the MS buffer size, and power. For example, in one embodiment, a MS may need a particular BS having data packet transmission capabilities, hence a BS having only voice capabilities will not satisfy the mobile station needs.

Referring again to FIG. 1A, at STEP 101 of the method 100 an attempt is initiated to acquire a list of suitable parameters by the MS. Such suitable parameters are intended to be used to potentially establish a primary communications connection with a BS on an authorized connection list. Embodiments of the present teachings utilize service priority information, cell loading information, and mobile station needs to determine an optimal BS to either maintain a primary communications link, or switch to a more optimal BS on an authorized connection list.

As shown in FIG. 1A, at a STEP 102 of the method 100, the MS receives signals from at least one BS indicating a level of cell loading and/or service priority information associated with such a BS in a network. The information received in STEP 102 is stored, for later retrieval, in the MS memory, when the MS determines a more optimal BS with which to establish a primary connection (e.g., F-PDCH).

As shown in FIG. 1A, in STEP 103 of the method 100, the MS selects a particular BS, from the authorized connection list, for a particular communications (e.g., voice, data) connection. The authorized connection list comprises BSs potentially satisfying the suitable parameters, comprising cell loading and/or service priority and mobile station needs. In STEP 103, if the MS determines that a BS to which the MS has a current primary communications channel is the most optimal BS (based upon the suitable parameters) then the MS will select that currently connected BS with which to maintain a primary communications channel (e.g., F-PDCH). On the other hand, if (based upon the suitable parameters) the MS should determine that another BS in the network will better serve the MS, then the MS will transmit a pattern to the network, signaling a request to initiate a switch from the current serving BS to the other BS better adapted to serve the MS needs. Such switching patterns are well known in the art and will therefore not be described further herein.

FIG. 1B illustrates one embodiment of an authorized connection list for organizing cell loading information at a MS. At the MS, BS information is organized such that each BS is assigned a base station identifier in row 104, such as for example BS A, which corresponds to base station "A". Each member of base station identifier 104 is a member of an authorized connection list from which the MS can determine which BS to connect.

Referring again to FIG. 1B, the second row representing cell loading indicator values 105 correspond to each BS from the first row of base station identifiers 104 respectively. Hence, BS A and BS C have a corresponding cell loading indicator value of "0", denoting that BS A and BS C should be removed from an authorized connection list of available BSs. By contrast, BS B, BS D, and BS E all have cell loading indicator values of "1", indicating that these BSs should be kept on the list of available BSs. BS G has a "0/1" value, indicating that this BS is not in an active set, as the MS already knows that BS G is, for example, congested or otherwise non-optimal for primary communications.

In accordance with one embodiment, the MS can use the information provided in the CELL_LOADING_INDICATOR field in order to guide it in selecting a new serving BS. This can be particularly useful when there are multiple valid switching candidates. The MS can use this information when there are multiple valid BS switching candidates, without blindly trying out each BS based purely on Channel Quality Indicator (CQI) measurements. Congestion information can also guide a searching process of a serving BS and thereby possibly avoid unnecessary searches.

In one embodiment, the information provided by the CELL_LOADING_INDICATOR message contains cell loading information of a serving BS as well as a potential target BS. Therefore, the information provided by the CELL_LOADING_INDICATOR, comprises a "sub-set" of the information that has been previously proposed. The additional information provided aids MSs in more intelligently performing cell switching procedures.

In another embodiment, the BS can utilize the CELL_LOADING_INDICATOR to communicate its worst problem to the MS. In one exemplary embodiment, the BS may have a strong pilot, but be near maximum capacity with respect to the total number of MS users currently access that particular sector. In this case, the CELL_LOADING_INDICATOR may convey such information to the MS.

In yet another embodiment, the CELL_LOADING_INDICATOR may convey information to the MS to aid in deciding when and/or where a BS handoff should be performed.

In one embodiment using CDMA technology, the row 104 comprises a maximum of six BSs on an authorized connection list, comprising an active set. Although BS "G" is on the authorized connection list, it is not currently on the active CDMA list for available base stations (as it is a seventh BS), but may, at a later time be moved onto the active list. Hence, at a first time, all the BSs in the base station identifier row 104, with the exception of BS G are on the active list, however, because BS A and BS C are being dropped from the active list, BS G, which is on the authorized connection list, may subsequently be transferred from the authorized connection list to the active list, provided updated suitable parameter information reveals that BS G is no longer congested, or otherwise non-optimal for primary communications. In this exemplary embodiment, BS A and BS C will be dropped from the active list, to the authorized connection list, whereby periodic updates regarding traffic congestion information may permit BS A and BS C to be reinstated to the active list should congestion lessen. This illustration is for exemplary purposes, and those of ordinary skill will readily recognize that BS G can comprise a plurality of BSs. Hence, the authorized connection list comprises as large a list as required by the MS designer.

The authorized connection list is an indestructible listing of BSs for which the MS has previously collected suitable parameter information. The authorized connection list is indestructible in the sense that all previously listed BSs remain in the MS memory. If a particular MS determines that it needs to switch to another BS, the MS can scan the authorized connection list for the most optimal BS to which it can connect. The MS can send out a query message to the most optimal BS currently on the authorized list, to update suitable parameter information at the MS, once it is determined that the MS must switch. Optionally, the MS can send out a plurality of quires to a plurality of BSs, in an effort to update suitable parameter information for each of the selected BSs on the authorized list. Subsequent to this update, the MS can initiate a switching pattern to the network and begin the switching process.

Switching Base Stations

Figure 1C:
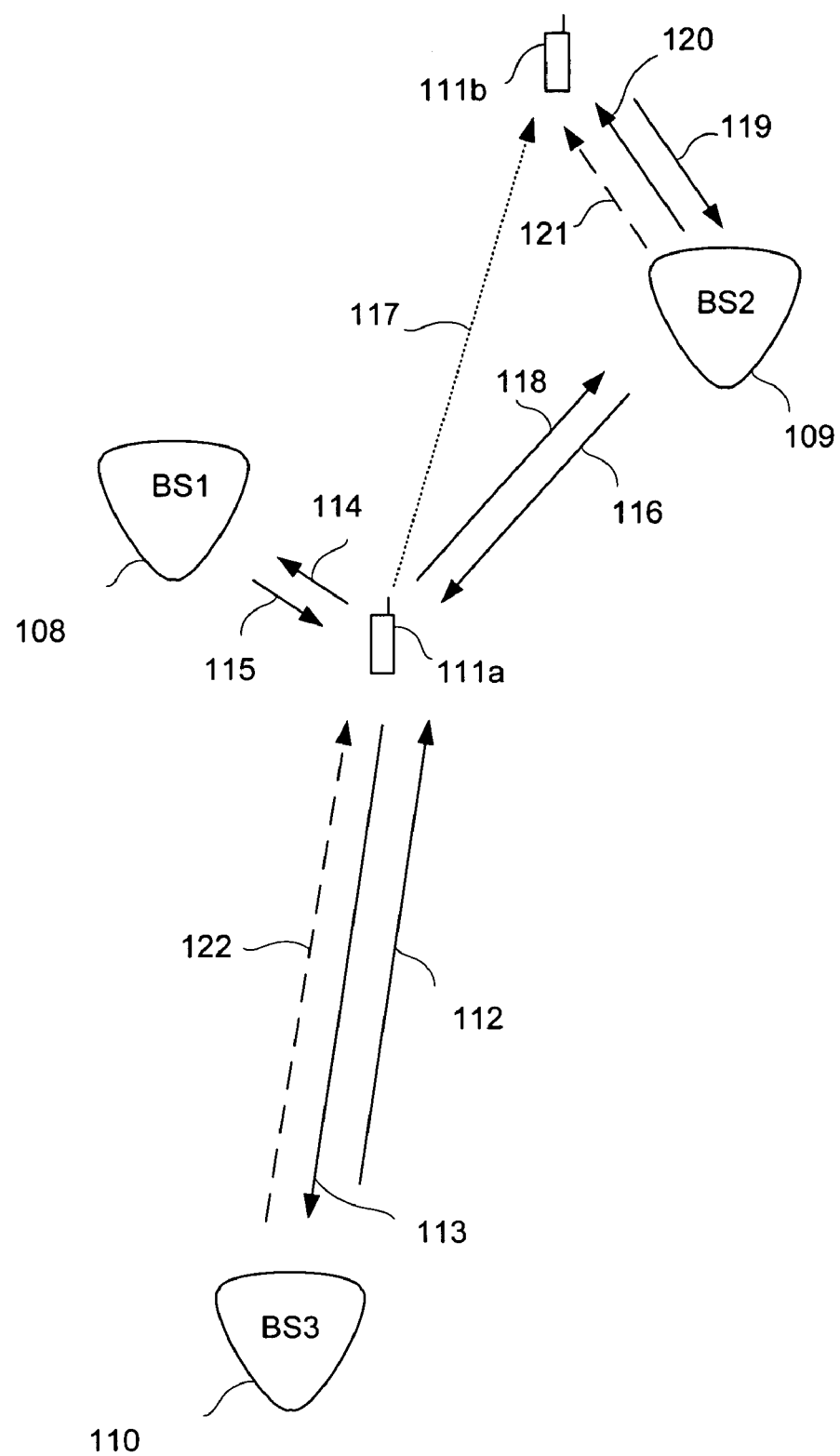
FIG. 1C is a simplified cell structure illustrating a distribution of BS cell sectors capable of servicing a MS, including sector-to-MS distance and path length.

FIG. 1C illustrates a simplified cellular structure illustrating a distribution of BS cell sectors capable of servicing a MS. FIG. 1C illustrates features of a general cellular communications system, including a mobile station (MS) 111*a* capable of establishing bidirectional voice and data communication with at least one of a multiplicity of base stations (BSs) 108, 109, and 110 on an authorized connection list. An authorized connection list comprises an inventory of BSs from which the MS 111*a* can assert a communications channel. In the exemplary illustration of FIG. 1C there are three BSs in the authorized connection list, BS1 108, BS2 109, and BS3 110. The authorized connection list is managed and retrievably stored in the MS 111*a*. In some embodiments, the authorized connection list comprises an active set, such as for example in a CDMA cellular system. An authorized connection list is not limited to any number of BSs, and this illustration is for exemplary purposes. That is, the authorized connection list in certain embodiments may comprise literally any number of BSs.

FIG. 1C also illustrates uplink and downlink active connection transmission pathways. Uplink ("UL") transmissions 113 from MS 111*a* to BS3 110 may include transmissions over a voice channel and/or one or more data channels. UL transmissions 114 to BS1 108 and 118 to BS2 109 from MS 111*a*, similarly may include transmissions over a representative voice channel and/or over a representative data channel. Downlink ("DL") transmission channel 112 from BS3 110, 115 from BS1 108, and 116 from BS2 109 similarly may include a voice channel, and/or one or more data channels.

In one embodiment, a forward packet data channel (F-PDCH) 122 is transmitted from a base station serving cell only. For example, in one embodiment, BS3 110 is the current serving cell, because a F-PDCH 122 is established to the MS 111*a*.

In one embodiment, MS 111*a* signals to BSs 108, 109, and 110 in a wireless network (e.g., an authorized connection list) that the MS 111*a* intends to switch from BS3 110 to BS2

109 by transmitting a switching pattern (not shown) to the network across a reverse channel quality indicator channel (R-CQICH). In one embodiment, channels 113, 114, and 118 represent the R-CQICH.

As shown in FIG. 1C, MS 111*a* moves from a first position to a second position at 111*b* along pathway 117. As 111*a* moves away from BS 3 110, having F-PDCH 122, MS 111*a* sends out a switching pattern to all BSs in the network that it intends to switch from BS3 110 (i.e., terminate the F-PDCH 122) and request a new F-PDCH 121 with BS2 109.

In selecting a BS from the authorized connection list to switch to, a MS 111*a* takes into account suitable parameters for establishing a F-PDCH, such as mobile station needs, cellular loading information and service priority. In one embodiment, only a serving BS transmits cell loading and priority information along a PDCCH extended message. In one alternate embodiment, each BS in the authorized connection list, BS1 108, BS2 109, and BS3 110 transmit specific cell loading and priority information, along 115, 116, and 112 respectively, to the MS 111*a* and 111*b* at periodic intervals.

In one embodiment, as the MS 111*a* receives cell loading information from each respective BS 108, 109, and 110 in the authorized connection list, the MS 111*a* ranks each BS hierarchically according to which BS has the least cellular traffic congestion. The MS 111*a* periodically polls each BS on the authorized connection list to update the hierarchical listing.

As will be described in more detail below, signaling can be terminated (i.e., acted on, such as for example, switching BSs) at any communications layer, including upper layers, LAC sublayer, MAC sublayer or physical layer.

Although the communication always has to descend to the physical layer to be transmitted, it could be acted on (i.e., switching BSs) at the receiving end after it has reached a high enough layer for the receiving end to recognize the signal. If the signal is acted on, by the MS, at the MAC layer, then the signal only has to just barely rise out of the physical layer and it can be acted on. The signal is a message that has been encoded (e.g., a word) that may have to go through software to be terminated. In one embodiment, a "terminated" point is the layer at which a switching decision is made.

Figure 1D:
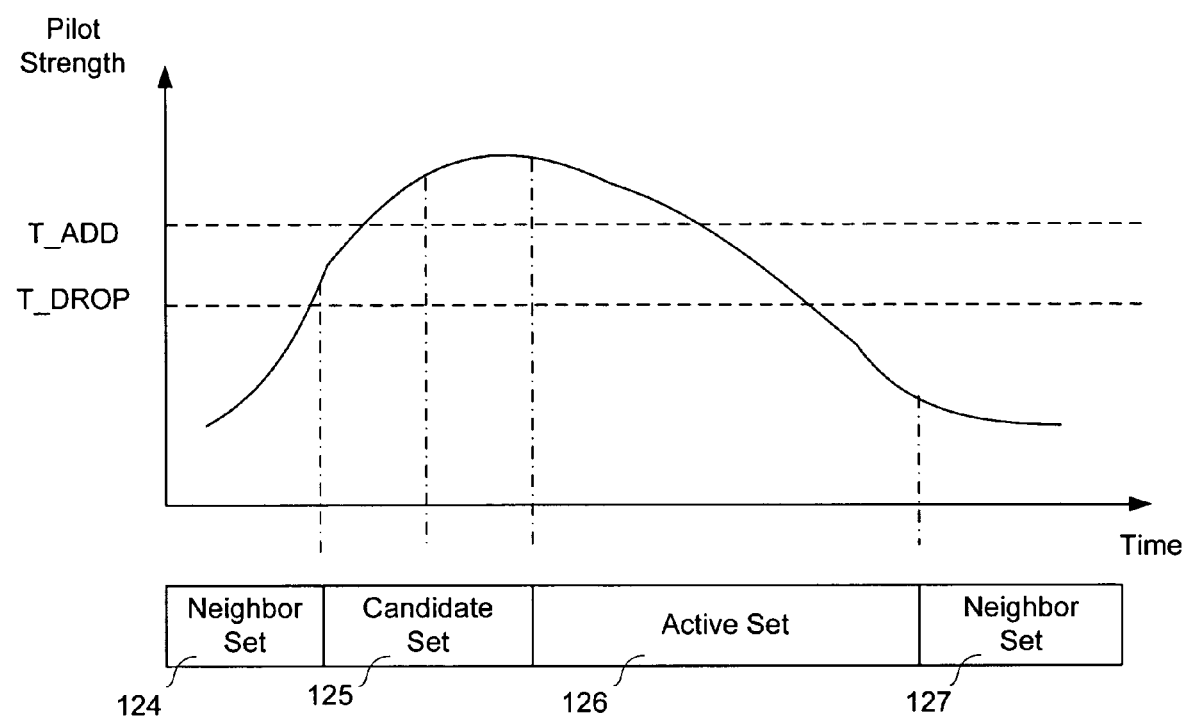
FIG. 1D is a pilot signal strength diagram illustrating a plurality of base stations (BSs) pilot strength.

FIG. 1D illustrates a pilot signal strength diagram illustrating different pilot strengths for BSs. In one embodiment, an authorized connection list comprises some or all of the different sets of BS, being a neighbor set 124, a candidate set 125, an active set 126, and another neighbor set 127. FIG. 1D shows pilot level signal strength measurement for each respective grouping of BS sets, as seen by a particular MS. In a typical CDMA system, if a pilot strength measurement for a BS rises above T_ADD, then the MS will add that BS to its candidate set 125 or its active set 126. If a BS pilot signal strength measurement falls below T_DROP, then such a BS will be dropped from the MS active set. In some embodiments, BSs on an authorized connection list comprise all BSs for which a MS can receive information pertaining to suitable parameters. That is, the MS collects information from a plurality of BSs, but does not strictly categorize such BSs into neighbor set 124, candidate set 125 or active set 126, although the MS could, in some embodiments strictly categorize such sets. Hence, in some embodiments, the authorized connection list is a more comprehensive listing of potential BSs for which the MS may establish a connection. In one embodiment, the authorized connection list is an active set 126, as in a CDMA cellular system.

FIG. 1E is an exemplary packet data control channel (PDCCH) message format for cell loading information. When a MS is assigned to a packet data channel, the MS is assigned an eight bit identifier, medium access control identifier ("MACID") 129, by the BS, to uniquely address the MS on the F-PDCCH. F-PDCCH messages are targeted to an individual MS by setting the MACID 129 field in the F-PDCCH service data unit ("SDU") to the MACID 129 assigned to that MS. A MACID 129 is assigned to a MS, by a BS, that is to decode a F-PDCH subpacket transmission concurrent with the transmission of this message on the F-PDCH. If MACID 129 is set to "00000000", the BS includes a WALSH_MASK field and omits the remaining fields. Otherwise, the BS omits the WALSH_MASK field and includes the remaining fields as illustrated in FIG. 1E. Whenever the MS detects its own MACID 129, it will start dispreading the F-PDCH channel and decoding of F-PDCCH channels.

An encoder packet size ("EP_SIZE") 130 is a three bit field set to '111' by the BS if a message transmitted on the F-PDCH contains an extended message. Otherwise, the BS shall set the EP_SIZE 130 field to the encoded value for the encoder packet size (a value other than '111') for a F-PDCH subpacket transmission concurrent with the transmission of this message on the F_PDCH.

If the EP_SIZE 130 is set by the BS to '111', then the BS shall also include two extra fields; a two bit field extended message type indicator ("EXT_MSG_TYPE") 131 and either a two bit field extended message sub-type ("EXT_MSG_SUB_TYPE") 132 or a six bit field cell loading indicator ("CELL_LOADING_INDICATOR") 133 field.

By setting the two bit EXT_MSG_TYPE 131 field to '10', the BS alerts the MS that it is transmitting cell loading and/or service priority information relevant to maintaining an authorized connection list of BSs for which the MS can establish a connection. As the MS receives updates relevant to cell loading or service priority, it can recalculate the optimal BS hierarchical order of the authorized connection list. Although the authorized connection list is updated periodically, as transmissions (e.g., cell loading) are incoming to the MS, no BSs are added or dropped from the authorized connection list of potential BS switching candidates. As such, in this embodiment, the authorized connection list comprises a comprehensive inventory of BSs for which the MS receives suitable parameter data.

Cellular Networks Layering Structure

CDMA cellular telephone communications systems have in the past been primarily implemented for voice communications, but presently there is a desire to add reasonably high-speed data communications capability to such systems. In order to achieve effective high-speed data transmission together with voice transmission (referred to herein as "EV-DV"), a number of CDMA system features are being added or modified. For example, in order to increase overall data rates, several additional physical channels are provided in EV-DV-capable CDMA MS transceivers to support high-speed packet data communication. Additionally, in order to enhance flexibility for delivering data to a multiplicity of users, the basic 20 ms frame structure of previous versions of CDMA protocol is being made controllable and addressable in "slots" having a duration of 1.25 ms. Although the following description provides an exemplary illustration of a cdma2000 system, it will be appreciated by those of ordinary skill that the teachings herein can be readily implemented and practiced in literally any CDMA system, such as for example any cdma2000 EV-DV and any wideband CDMA (W-CDMA) high speed downlink packet access (HSDPA) system.

Figure 1F:
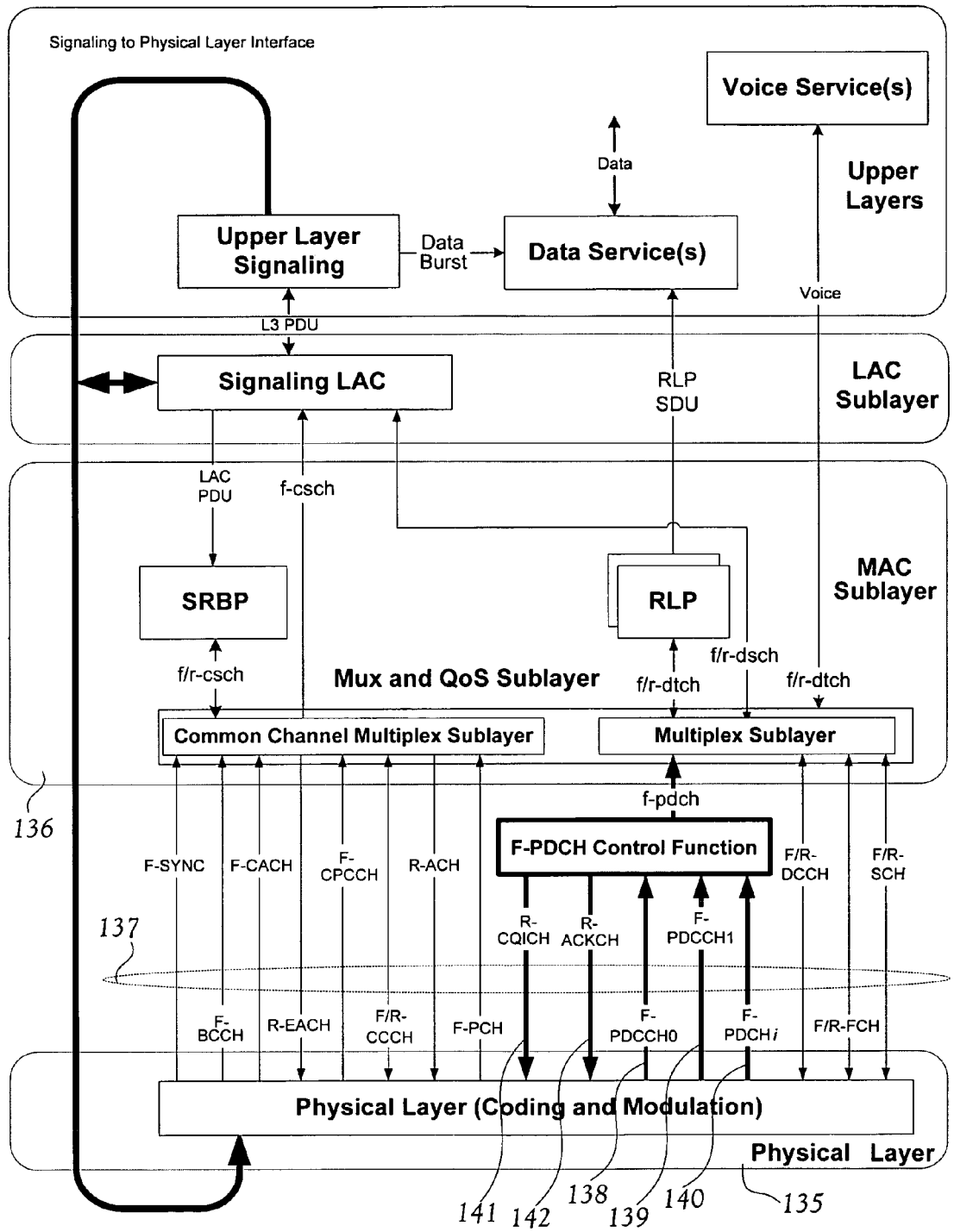
FIG. 1F is a block diagram of a layer architecture for an exemplary data-voice communication mobile station ("MS") having multiple physical channels to facilitate high-speed packet data communications.

FIG. 1F is a block diagram of a layer architecture for an exemplary data-voice communication MS having multiple physical channels to facilitate high-speed packet data communications. The physical channels added to support packet data capabilities include both forward and reverse channels. FIG. 1F illustrates an exemplary interface between a physical layer 135, and a medium access control ("MAC") layer 136, used by a CDMA EV-DV MS. Each one of a set of physical channels 137 is indicated by an arrow with a channel label. The direction of the arrow indicates the direction of information flow for the particular channel: forward ("F") channels communicate information to the MS (into the MAC layer), while reverse ("R") channels communicate information from the MAC layer of the MS to a BS. Some channels are bidirectional, indicated by double-ended arrows and "F/R" prefixed to the channel label.

Physical channels identified as components of a Forward Packet Data Control Function ("F-PDCF") include two forward packet data control channels ("F-PDCCHs" or simply "PDCCHs"), F-PDCCH0 138 and F-PDCCH1 139. The F-PDCCHs convey information from the BS to indicate, for example, whether a particular packet "belongs" to a target MS, and how the MS may decode data that it receives. The primary payload data channel is a forward packet data channel (F-PDCH) F-PDCHi 140. A F-PDCHi 140 assigned to the MS may be selected from among a plurality of such packet data channels that are available from the serving base station. A particular F-PDCHi (hereafter merely "PDCH") may be subdivided, and shared among a plurality of users. A MAC sublayer 136 of the MS is shown in a configuration in which it will receive packet data via the F-PDCHi 140. A Reverse Channel Quality Indication Channel ("R-CQICH") R-CQICH 141 provides feedback information, indicative of signal quality, from the MS to the serving BS. A Reverse Acknowledge Channel ("R-ACKCH"), R-ACKCH 142, is used by the MS to acknowledge correct receipt (ACK), or to indicate failure to receive a particular packet (NAK). These different physical channels may have very different bit rate capacities. For example, the packet data control channels F-PDCCH0 138 and F-PDCCH1 139 may convey only a few thousand bits per second ("bps"), while F-PDCH packet data channels may convey roughly 3 Mbps.

F-PDCCH Messaging from BS to MS

Some cellular communications systems offer an extended packet data channel message ("PDCCH"), having eight (8) [7:0] reserved bits. In one embodiment, cell loading and priority information is transmitted from a BS to a MS via the extended PDCCH message. The PDCCH message may be triggered by a change in congestion levels at the BS, or as a response to a MS switching request. The MS uses cell loading and/or priority information for guidance in determining a selection of a new serving BS, particularly when there are multiple valid candidates, without blindly trying out these BSs purely based on CQI measurements. The information transmitted via the extended PDCCH (e.g., cell loading) can also guide the searching process of a serving BS and possibly avoid unnecessary searches or improve search quality. In some embodiments, congestion information is based on quality of service ("QoS") and such information is conveyed to the MS via the extended PDCCH. Hence, the MS has more information and control over switching decisions, without the limitations of previous cellular systems (i.e., adding/dropping BS from a switching list). Some embodiments have an ability to re-enable a particular BS to a primary communications link, or to an authorized connection list, without requiring L3 signaling, as will be described further below.

Encoding Forward Packet Data Control Channel Messages

In one embodiment, a BS encodes a service data unit ("SDU") to be transmitted to a MS on a forward packet data control channel ("F-PDCCH"). Table 1 provides a format for encoding cell loading and priority information.

Format of the Forward Packet Data Control Channel Message

TABLE 1

F-PDCCH Format

| Field | Length (bits) |
|---|---|
| MAC_ID | 8 |
| WALSH_MASK | 0 or 13 |
| CURRENT_LOADING_LEVEL | 0 or 13 |
| EP_SIZE | 0 or 3 |
| ACID | 0 or 2 |
| SPID | 0 or 2 |
| AI_SN | 0 or 1 |
| LWCI | 0 or 5 |
| EXT_MSG_TYPE | 0 or 2 |
| SECTOR_LOAD_CTRL | 0 or 8 |
| RESERVED | 0 or 8 |

MAC_ID - MAC Identifier
WALSH_MASK - Walsh Space Mask Bitmap
CURRENT_LOADING_LEVEL - Congestion level
EP_SIZE - Encoder Packet Size
ACID - ARQ Channel Identifier
SPID - Subpacket Identifier
AI_SN - ARQ Identifier Sequence Number
LWCI - Last Walsh Code Index
EXT_MSG_TYPE - Extended Message Type Identifier
SECTOR_LOAD_CTRL - See below
RESERVED - Reserved Bits Similar to the 3GPP2 document C.S0003-C, entitled, "Medium Access Control (MAC) Standard for cdma2000 Spread Spectrum Systems" Release C, Table 1 defines various fields and bit lengths. Each field is defined substantially similar to Release C for cdma2000, with the addition of a "CURRENT_LOADING_LEVEL" and "SECTOR_LOAD_CTRL" fields. The CURRENT_LOADING_LEVEL field conveys information, along the F-PDCCH regarding specifically cell loading data. Other fields are defined consistent with Release C, particularly; see pages 2-139-2-142.

The SECTOR_LOAD_CTRL Field

In some embodiments, if an EP_SIZE field is set to "111", a BS includes a EXT_MSG_TYPE field in a F-PDCCH message; otherwise, the BS shall omit that field in its transmission to the MS.

In some embodiments, a BS sets the EXT_MSG_TYPE field to '00', '01', and '10' to convey certain types of information, as will be described more fully below. The BS sets this field to '00' to indicate that the mobile station is to exit PDCH Control Hold Mode. The base station may set this field to '01' to indicate that the MS is to terminate the current switching transmission pattern prior to the maximum switching frames (NUM_SOFT_SWITCHING_FRAMESs or NUM_SOFTER_SWITCH_FRAMESs).

In one embodiment, if the EXT_MSG_TYPE field is set to '10', then a SECTOR_LOAD_CTRL field conveys certain information to a MS, such as for example CELL_SWITCH_DIRECT_MSG, PILOT_MGMT_MSG, or CELL_SWITCH_REDIRECT_MSG.

If the EXT_MSG_TYPE field is set to '10', the BS shall set the 8-bit ([7:0]) SECTOR_LOAD_CTRL field as follows:

If Bits [7:6]=11=>CELL_SWITCH_DIRECT_MSG, then
  Bit [5]—Serving Cell Congestion:
  "0"=slightly congested, switching recommended
  "1"=highly congested, switching requested
  Bits [4:0]—Remaining Cells Congestion:
  "0"=not congested relative to serving cell
  "1"=congested relative to serving cell
  Each bit is mapped to one of the remaining non-serving sectors ordered 1 through 5 as received in a universal handoff direction message ("UHDM") with the current serving sector removed. If there are fewer than 5 non-serving sectors in UHDM, the unused bits are set to 1.

Else if Bits [7:4]=0011=>PILOT_MGMT_MSG, then
  Bit [3]—Disable/Re-enable a F-PDCH active set member for F-PDCH operation.
  "0"=Disable the sector indicated by Bit [2:0]
  "1"=Re-enable the sector indicated by Bit [2:0]
  Bits [2:0]—Walsh cover index of the associated with the F-PDCH active set member under concern.

Else =>CELL_SWITCH_REDIRECT_MSG
  The PDCCH message is used to redirect a MS in response to its cell switch request. The 8-bit field is divided into 4 2-bit groups indicating the cell loading level of the remaining non-serving sectors (max 4), ordered (k=0, 1, 2, 3) as received in UHDM with the serving cell and target cell removed. If there are fewer than 4 non-serving sectors remaining, the unused bits are set to 00 and shall be ignored by MS. The bit field is defined as follows for each non-serving sector.

Bits [2k+1:2k]=00=>OK to switch to.
  Bits [2k+1:2k]=01=>switch to at MS's discretion.
  Bits [2k+1:2k]=10=>avoid to switch to.
  Bits [2k+1:2k]=11=>Illegal/Reserved.

In one embodiment, the formats of the above three types of messages (CELL_SWITCH_DIRECT_MSG, PILOT_MGMT_MSG, or CELL_SWITCH_REDIRECT_MSG) are summarized in the following table:

TABLE 2

Message Format for the SECTOR_LOAD_CTRL field

| CELL_SWITCH_DIRECT_MSG | PILOT_MGMT_MSG | CELL_SWITCH_REDIRECT_MSG |
|---|---|---|
| CELL_SWITCH_DIRECT_MSG_IND ='11'(2 bits) | PILOT_MGMT_MSG_IND ='0011'(4 bits) | REMAINING_NON_SERVING_SECTOR_CONGESTION_LEVEL (8bits) |
| SERVING_SECTOR_CONGESTION_LEVEL (1 bit) | PILOT_MGMT_ACTION (1 bit) | |
| NON_SERVING_SECTOR_CONGESTION_LEVEL (5bits) | PILOT_WALSH_COVER (3 bits) | |

In another embodiment, the formats of the above three types of messages (CELL_SWITCH_DIRECT_MSG, PILOT_MGMT_MSG, or CELL_SWITCH_REDIRECT_MSG) are summarized in the following table:

TABLE 3

Alternate Message Format for the SECTOR_LOAD_CTRL field

| CELL_SWITCH_DIRECT_MSG | PILOT_MGMT_MSG | CELL_SWITCH_REDIRECT_MSG |
|---|---|---|
| CELL_SWITCH_DIRECT_MSG_IND = '11' (2 bits) | PILOT_MGMT_MSG_IND = '0011' (4 bits) | CONGESTION_LEVEL_OF_REMAINING_NON_SERVING_SECTOR_0 (00/01/10, 2 bits) |
| CONGESTION_LEVEL_OF_NON_SERVING_SECTOR_1 (0/1, 1bit) | PILOT_MGMT_ACTION (1 bit) | CONGESTION_LEVEL_OF_REMAINING_NON_SERVING_SECTOR_1 (00/01/10, 2 bits) |
| CONGESTION_LEVEL_OF_NON_SERVING_SECTOR_2 (0/1, 1bit) | PILOT_WALSH_COVER (3 bits) | CONGESTION_LEVEL_OF_REMAINING_NON_SERVING_SECTOR_2 (00/01/10, 2 bits) |
| CONGESTION_LEVEL_OF_NON_SERVING_SECTOR_3 (0/1, 1bit) | | CONGESTION_LEVEL_OF_REMAINING_NON_SERVING_SECTOR_3 (00/01/10, 2 bits) |
| CONGESTION_LEVEL_OF_NON_SERVING_SECTOR_4 (0/1, 1bit) | | |
| CONGESTION_LEVEL_OF_NON_SERVING_SECTOR_5 (0/1, 1bit) | | |
| CONGESTION_LEVEL_OF_NON_SERVING_SECTOR1 (0/1, 1bit) | | |

Each practical and novel combination of the elements and alternatives described hereinabove, and each practical combination of equivalents to such elements, is contemplated as an embodiment of the invention. Because many more element combinations are contemplated as embodiments of the invention than can reasonably be explicitly enumerated herein, the scope of the invention is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art. Furthermore, to the extent that the term "includes" is used in either the detailed description or the claims, such term is intended to be inclusive in a manner similar to the term "comprising."

What is claimed is:

1. A method of managing connections to base stations ("BSs") from a mobile station ("MS"), comprising:
   a) acquiring, at the MS, a list of suitable parameters relevant to establishing an active connection to a BS on an authorized connection list with which connection may be asserted by the MS;
   b) receiving, at the MS, cell loading information that is associated with a corresponding one of the BSs that continues thereafter to be specified in the authorized connection list, and retrievably storing, in association with such BS, cell loading information reflective of such received information, and;
   c) selecting, at the MS, a BS for particular communications from among those specified in the authorized connection list based upon the suitable parameters that includes the associated cell loading information.

2. The method of claim 1, wherein step (b) of receiving further comprises receiving at the MS priority information from the BS.

3. A method of managing connections to base stations ("BSs") from a mobile station ("MS"), comprising:
   a) acquiring, at the MS, a list of suitable parameters relevant to establishing an active connection to a BS on an authorized connection list with which connection may be asserted by the MS;
   b) receiving, at the MS, cell loading information that is associated with a corresponding one of the BSs that continues thereafter to be specified in the authorized connection list, and retrievably storing, in association with such BS, cell loading information reflective of such received information, and;
   c) selecting, at the MS, a BS for particular communications from among those specified in the authorized connection list based upon the suitable parameters that includes the associated cell loading information,
   wherein step (c), selecting a BS for particular communications, is performed repeatedly at different times, and further comprises:
      i) at a first time selecting from the authorized connection list a different BS instead of an otherwise qualified first BS due to the suitable parameter information associated therewith indicating that the first BS has an elevated level of congestion compared to the different BS, and
      ii) at a second time selecting from the authorized connection list an otherwise qualified second BS despite the suitable parameter information associated therewith indicating that the second BS has an elevated level of congestion compared to a different, unselected BS of the authorized connection list.

4. The method of claim 3, wherein the authorized connection list is a list of Active Set members for an MS in a CDMA cellular system.

5. The method of claim 4, wherein the suitable parameters include reflections of physical channel quality.

6. The method of claim 3, wherein step (b) further comprises storing at least one bit associated with each BS of the authorized connection list to represent cell loading information associated with such BS.

7. The method of claim 3, further comprising communicating, between the MS and the BS, an indication of congestion for all BSs on the authorized connection list of the MS in a single control data packet.

8. The method of claim 3, wherein the particular communications for which the BS is selected are high-speed user packet-data communications conveyed via a packet data channel (PDCH) in a CDMA cellular system.

9. The method of claim 8, wherein the indication of congestion level is provided to the MS from a BS via an extended packet data control channel (PDCCH) message.

10. A connection management system comprising a wireless system having a MS, at least one BS and wherein the wireless system has a capability to establish at least one communications channel, the connection management system comprising:
   a) acquiring means for acquiring a list of suitable parameters relevant to establishing an active connection to a BS on an authorized connection list;
   b) receiving means for receiving a quantity of cell loading information;
   c) storing means for retrievably storing the quantity of cell loading information, and;
   d) selecting means for selecting a BS for particular communications from among those specified on the authorized connection list based upon the suitable parameters that includes the quantity of cell loading information.

11. The connection management system of claim 10, wherein the wireless system is a CDMA cellular system.

12. The connection management system of claim 10, wherein the list of suitable parameters acquired by the acquiring means include reflections of physical channel quality.

13. The connection management system of claim 12, wherein the authorized connection list acquired by the acquiring means is a CDMA active set.

14. A system for managing connections between a MS and a plurality of BSs in a wireless CDMA network, comprising:
   a) an authorized connection list having at least one BS listed thereon;
   b) an acquiring means, at the MS, for acquiring a quantity of suitable parameter information relevant to establishing a primary communications channel to a BS on the authorized connection list;
   c) a receiving means, at the MS, for receiving the quantity of suitable parameter information;
   d) a selecting means for selecting an optimal BS on the authorized connection list for the MS to initiate a primary communications channel for a particular communications.

15. The system of claim 14, wherein the quantity of suitable parameter information comprises a quantity of cell loading information.

16. The system of claim 14, wherein the quantity of suitable parameter information comprises a quantity of priority information.

17. The system of claim 14, wherein the particular communications for which the BS is selected are high-speed user packet-data communications conveyed via a packet data channel (PDCH) in a CDMA cellular system.

18. The system of claim 17, wherein an indication of cell loading level is provided to the MS from a BS via an extended packet data control channel (PDCCH) message.

19. The system of claim 18, wherein an indication of cellular congestion is conveyed from a BS to the MS via a F-PDCCH in a current loading level bit field.

20. The system of claim 18, wherein a cell switching message bit field is conveyed from a BS to the MS via a F-PDCCH in a sector load control bit field.

21. A method for administrating connections between a MS and a plurality of BSs in a CDMA network, comprising:
   a) a step of acquiring a list of suitable parameter information reflective of at least one BS on an authorized connection list;
   b) a step of receiving information relevant to establishing a wireless connection between the MS and the at least one BS on the authorized connection list, and;
   c) a step of selecting a particular BS from the authorized connection list for establishing a primary communications channel for a particular communications.

22. The method as recited in claim 21, wherein the acquiring step a) further includes the steps of:
   i) assigning a base station identifier code, which is unique to each member of the authorized connection list;
   ii) calculating a cell loading indicator value for each member of the authorized connection list.

23. The method as recited in claim 21, wherein the authorized connection list comprises an active set in a CDMA cellular system.

24. The method as recited in claim 21, wherein the received information relevant to establishing a wireless connection comprises a quantity of cell loading information.

25. The method as recited in claim 24, wherein the cell loading information is a member of the group consisting of: static cell loading characteristics, or dynamic cell loading characteristics.

26. The method as recited in claim 24, wherein the quantity of cell loading information is selected from a group consisting of: static switching latency information, static broadcast latency information, dynamic switching latency information, or dynamic broadcast latency.

27. The method as recited in claim 21, wherein the received information relevant to establishing a wireless connection comprises a quantity of MS priority information.

28. The method as recited in claim 21, wherein the suitable parameters include reflections of physical channel quality.

* * * * *